United States Patent [19]

Nachazel

[11] 4,431,030

[45] Feb. 14, 1984

[54] FLUID TIMING ELEMENT, ESPECIALLY A PNEUMATIC TIMING ELEMENT FOR USE IN HOUSEHOLD APPLIANCES, SUCH AS ELECTRIC TOASTERS

[75] Inventor: Jiri Nachazel, Stein an der Traun, Fed. Rep. of Germany

[73] Assignee: Bosch-Siemens Hausgeräte GmbH, Stuttgart, Fed. Rep. of Germany

[21] Appl. No.: 182,458

[22] Filed: Aug. 28, 1980

[30] Foreign Application Priority Data

Aug. 31, 1979 [DE] Fed. Rep. of Germany ....... 2935299

[51] Int. Cl.³ .......................... F15D 1/02; F01B 29/08
[52] U.S. Cl. .......................................... 138/45; 138/46; 335/61; 92/143; 16/84
[58] Field of Search ....................... 138/40, 44, 45, 46; 16/84, 66; 239/533.13; 92/143; 200/34; 188/297, 311, 313, 316; 267/112, 113, 114, 124; 251/122; 335/61

[56] References Cited

U.S. PATENT DOCUMENTS

| | | | |
|---|---|---|---|
| 1,963,424 | 6/1934 | Smith | 138/46 |
| 2,014,314 | 9/1935 | Defenbough | 251/122 |
| 3,058,146 | 10/1962 | Harrison et al. | 16/66 |
| 3,139,114 | 6/1964 | Benzel | 138/45 |
| 3,365,166 | 1/1968 | Smith | 251/122 X |
| 3,739,983 | 6/1973 | Jousson | 138/45 X |
| 3,797,741 | 3/1974 | Spencer | 138/45 X |
| 4,110,868 | 9/1978 | Imazaike | 16/666 X |
| 4,256,021 | 3/1981 | Graninger | 138/45 X |

*Primary Examiner*—James E. Bryant, III
*Attorney, Agent, or Firm*—Herbert L. Lerner; Laurence A. Greenberg

[57] ABSTRACT

A fluid timing element, comprising a nozzle, a needle being at least partly insertable into the nozzle forming a choke gap therebetween, at least one of the nozzle and the needle being axially tapered, the nozzle and the needle being axially movable relative to each other for adjusting the choke gap, the nozzle and the needle having different cross-sectional shapes and having at least two wall sections distributed over the peripheries thereof projecting into and constricting the choke gap.

8 Claims, 7 Drawing Figures

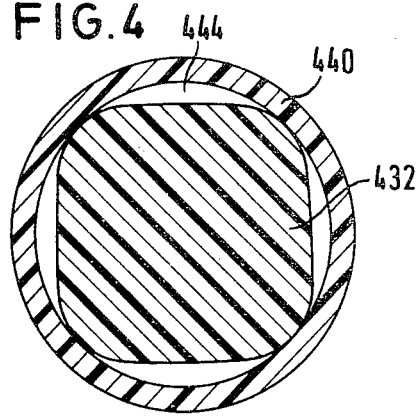
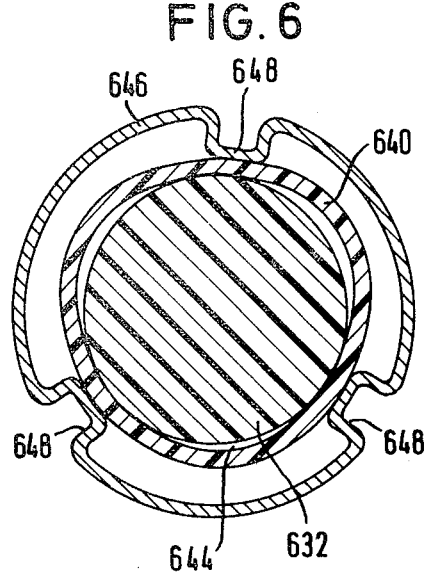
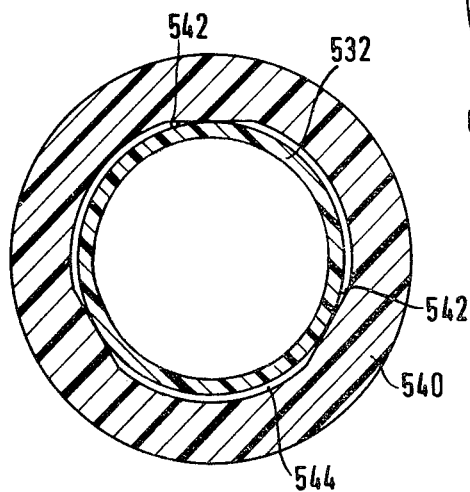
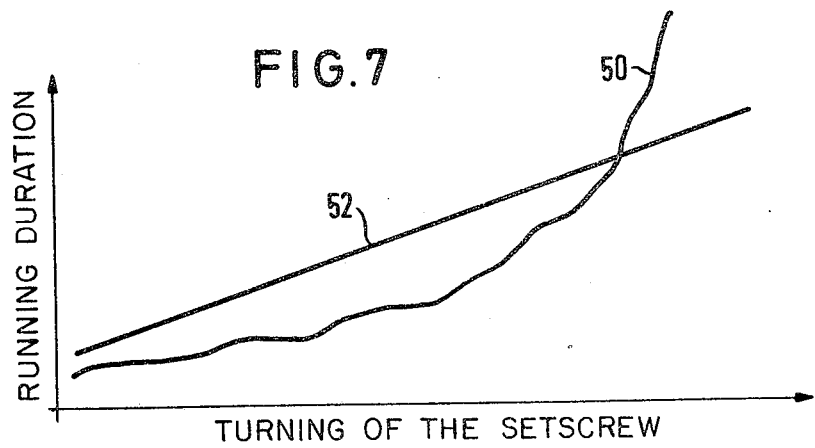

FLUID TIMING ELEMENT, ESPECIALLY A PNEUMATIC TIMING ELEMENT FOR USE IN HOUSEHOLD APPLIANCES, SUCH AS ELECTRIC TOASTERS

The invention relates to a fluid timing element, especially a pneumatic timing element for use in household appliances, such as electric bread toasters with a variable choke point, including a nozzle and a nozzle needle, where the nozzle and/or the nozzle needle are tapered in the axial direction and are constructed so that they can be axially moved relative to each other.

Such a timing element is known from German Pat. No. 26 24 578. There, a conical nozzle needle is axially movable in a conical nozzle in order to change the choke gap therebetween. With small diameters of a few millimeters for the nozzle and the nozzle needle, the width of the necessary choke gap is in the micrometer range and the tolerances and the geometry of the parts must be even tighter by an order of magnitude. The required tolerances can hardly be met in mass production, particularly if the parts are made by injection molding, and especially of thermo-plastic materials, which, for instance, lead to the condition that the running speed and therefore the running time does not change uniformly with uniform axial movement of the nozzle needle, and the characteristic accordingly has breaks. This means that, for instance, if the nozzle needle is moved in the direction toward longer running times, shorter running times are actually obtained in certain ranges of the characteristic.

It is accordingly an object of the invention to provide a fluid timing element, especially a pneumatic timing element for use in household appliances, such as electric toasters, which overcomes the hereinafore-mentioned disadvantages of the heretofore-known devices of this general type, and which equalizes the characteristic in the timing element.

With the foregoing and other objects in view there is provided, in accordance with the invention, a fluid timing element particularly a pneumatic timing element with an adjustable choke point, including a nozzle, a needle being at least partly insertable into the nozzle forming a choke gap therebetween, at least one of the nozzle and the needle being axially tapered, the nozzle and the needle being axially movable relative to each other for adjusting the choke gap, the nozzle and the needle having different cross-sectional shapes and having at least two wall sections distributed over the peripheries thereof projecting into and constricting the choke gap.

In accordance with another feature of the invention, the at least two wall sections are at least three wall sections.

In accordance with a further feature of the invention, the nozzle and the needle are axially pressable into each other to exert radial pressure on each other for more or less elastically deforming the cross-sectional shapes thereof over a given normal adjustment range.

This solution has the advantage that the nozzle and nozzle needle parts act upon each other and adapt themselves to each other, whereby reproducible conditions are obtained even if the parts have manufacturing tolerances in the range of one-hundredth of a millimeter. Furthermore, the surface condition of the needle and the nozzle is less critical, since the ring gap forming the choke point is subdivided into two or more canals and turbulence of the flow due to a surface irregularity always has an effect on only one canal and the other canals remain uninfluenced.

It is a further important advantage that the characteristic, or the choke characteristic, is largely linear. In the known timing element described hereinafore, the choke gap is also made linearly narrower with a linear positioning movement, whereby, however, the coke resistance progressively increases exponentially and the characteristic thereby increases exponentially toward longer running times.

With the herein-proposed solution to this problem, the decrease of the choke gap is regressively exponential and thereby counter-acts the non-proportional change of the choke resistance, which leads to a straighter characteristic.

In accordance with an added feature of the invention, the nozzle has thin walls formed of elastic material so that its cross section is elastically deformable. At the same time or alternatively, in accordance with an additional feature of the invention, the needle is hollow and has thin walls formed of elastic material, so that its cross section is elastically deformable. Thin walls and therefore a possible hollow construction of the nozzle needle can be dispensed with if rubber-elastic material is used.

To simplify production and equalize friction in the case of a rotating nozzle needle, in accordance with still another feature of the invention, one of the different cross-sectional shapes of the nozzle and the needle is round and one is non-round or unround.

In accordance with still a further feature of the invention, the one of the nozzle and the needle having a non-round cross-sectional shape has at least three points distributed over the periphery thereof resting against the one of the nozzle and the needle having a round cross-sectional shape. Similar profiles are axially lined up so that the contact points of the cross sections always result in approximately axial contact lines. The slope of the characteristic of the timing element depends on the number of contact points or contact lines between the parts.

In accordance with still an added feature of the invention, the nozzle has an inner surface having a non-round cross-sectional shape formed of a round shape interrupted by secant-shaped sections. The nozzle needle with round cross section rests against the secant surfaces, of which preferably at least three are provided.

In accordance with still an additional feature of the invention, there is provided a set screw non-rotatably or antirotationally connected to the needle.

In accordance with again a further feature of the invention, at least one of the nozzle and needle is a plastic part, and including spring means formed of permanently elastic material for reinforcing the at least one plastic part.

In accordance with again another feature of the invention, the spring means are formed of metal, for instance in the form of spring-elastic metal rings. In most cases, however, the occurring forces are so small that the plastic material is only deformed elastically, and not plastically as well, even if one setting is retained for an extended period of time.

In accordance with a concomitant feature of the invention, the at least one plastic part has a normally round cross-sectional shape being deformed by the spring means into a non-round cross-sectional shape.

If the unround part is made more solid and the round part more deformable, it may be advantageous, if plastic is used, to connect the nozzle needle permanently or rigidly to the set screw, so that it is rotated for adjustments and therefore other points of the round part always come into contact with the ribs of the unround part, which counteracts material fatigue.

Other features which are considered as characteristic for the invention are set forth in the appended claims.

Although the invention is illustrated and described herein as embodied in a fluid timing element, especially a pneumatic timing element for use in household appliances, such as electric toasters, it is nevertheless not intended to be limited to the details shown, since various modifications and structural changes may be made therein without departing from the spirit of the invention and within the scope and range of eqivalents of the claims.

The construction and method of operation of the invention, however, together with additional objects and advantages thereof will be best understood from the following description of specific embodiments when read in connection with the accompanying drawings, in which:

FIG. 4 is a view similar to FIG. 3, showing modified embodiments of the nozzle and the nozzle needle;

FIG. 5 is also a view similar to FIG. 3, showing a further modified embodiment of the nozzle and the nozzle needle;

FIG. 6 is another view similar to FIG. 3, showing a further modified embodiment of the nozzle and nozzle needle; and FIG. 7 is a graphical representation of nozzle characteristics.

Figure 1:
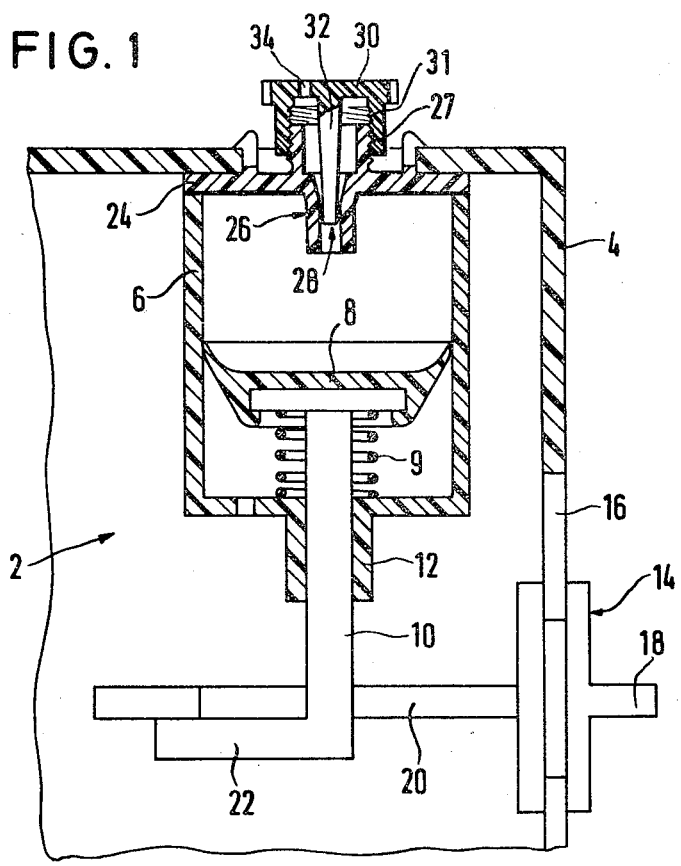
FIG. 1 is a fragmentary diagrammatic vertical cross-sectional view, partly broken away, of a pneumatic timing element built into the control housing of a toaster, with a highly diagrammatically-shown choke point.

Referring now to the figures of the drawing and first particularly to FIG. 1 thereof, it is seen that the pneumatic or fluid timing element 2 is built into a control housing 4 of a toaster which is not shown in detail, and includes a cylinder 6. A piston 8 which is disposed in the cylinder 6 is pretensioned upward by a compression spring 9 and has a piston rod 10 which extends through a guide 12 of the cylinder 6 at the bottom thereof. A winding-up slider 14 which passes through the wall of the control housing 4, is guided in a slot 16 of this wall and has a winding-up handle 18 on the outside of the housing, and an actuating arm 20 projecting horizontally inward on the inside thereof. An actuating extension 22 which extends laterally away from the lower end of the piston rod 10, engages under the actuating arm 20.

The top of the cylinder 6 is closed off by a cylinder head 24, through which a vertical tube stub 26 that is formed on the head 24 passes. In the tube stub 26, a choke point 28 is formed. The part of the tube stub 26 which extends outwardly or upwardly away from the cylinder 6 has an external thread 27 formed thereon onto which a setscrew 30 with an internal thread 31 is screwed. A nozzle needle 32 extending centrally downward adjusting the choke point as well as an air discharge opening 34 located at the top, are formed in the setscrew 30.

If the piston 8 is pulled down by the winding-up slider 14, air flows past its collar into the upper cylinder space. The compression spring 9 pushes the piston 8 upward as soon as the slider handle 18 is released and in the process pushes the air above through the choke point 28. The running speed of the piston and therefore the running time of the timing element depends on the adjustment of the choke point 28. Taking the winding-up slider 14 along, the piston 8 slides slowly upward. After the winding-up slider is released, the piston 8 operates a release mechanism, which is shown in detail for instance in German Pat. No. 26 24 578, at a certain height and a certain period of time which depends on the setting of the choke point.

Figure 3:
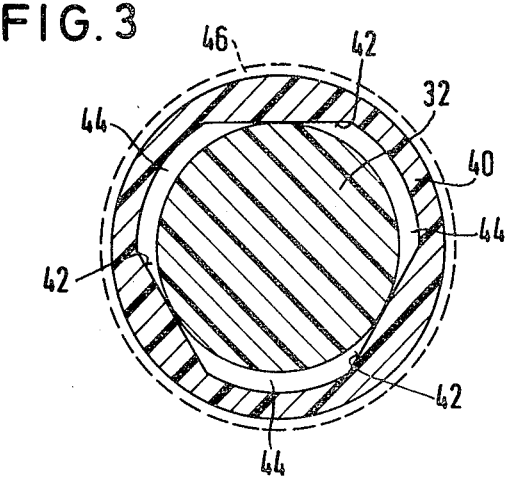
FIG. 3 is a slightly enlarged cross-sectional view taken substantially along the line III—III shown in FIG. 3, in the direction of the arrows.
Figure 2:
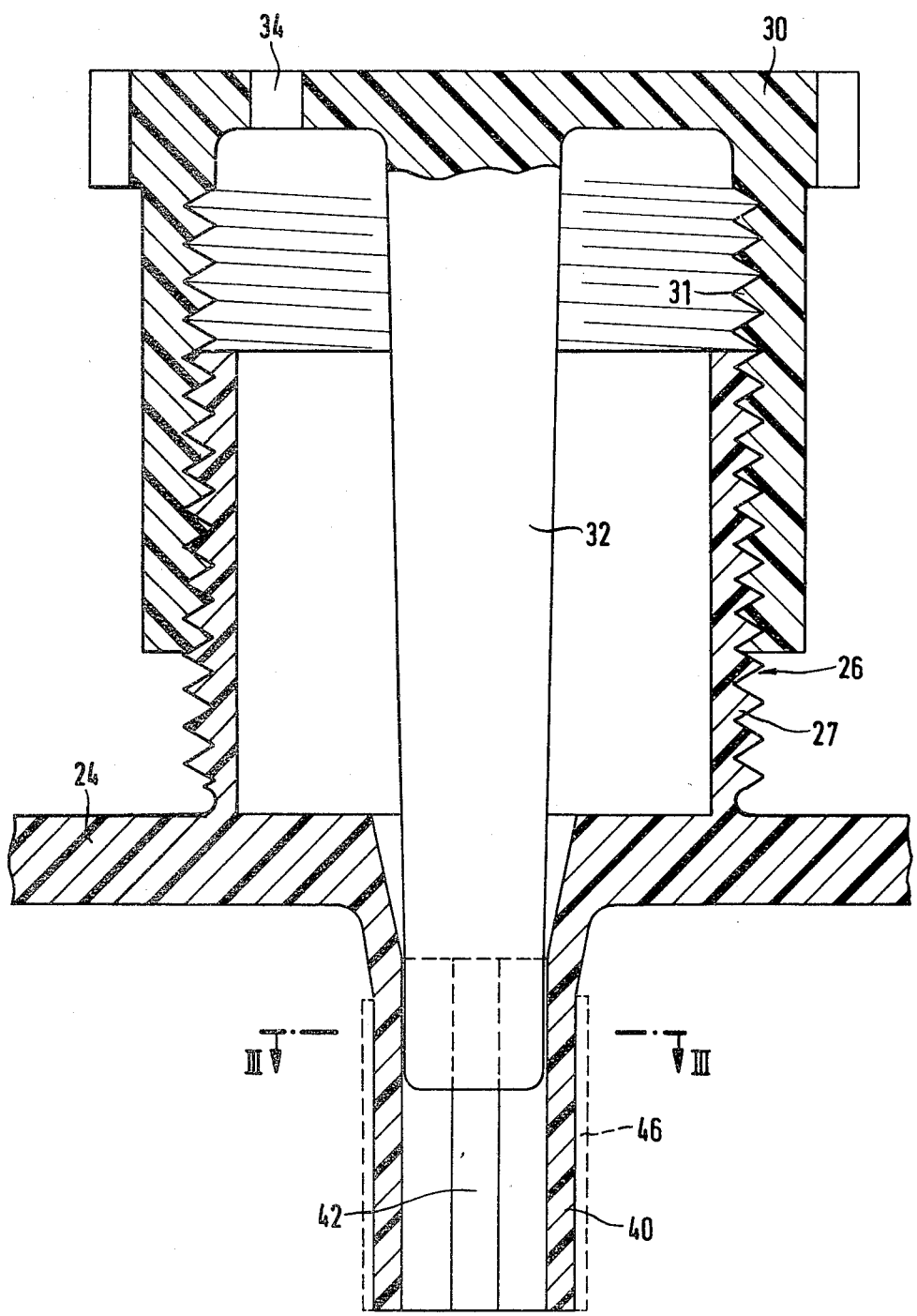
FIG. 2 is an enlarged view of the portion of FIG. 1 showing the cylinder cover of the timing element with a choke point.

The choke point 28 is shown in greater detail in FIGS. 2 and 3. The part of the tube stub 26 extending into the cylinder 6, which goes through the cylinder lid 24, is constructed as a nozzle 40, which is uniformly tapered downward. The cross section of the nozzle 40 is substantially circular but has secant surfaces on the inside thereof when extend substantially axially and are uniformly distributed over the circumference. These secant surfaces are very simply obtained in the manufacture of the cylinder head with the nozzle formed as a plastic injection-molded part, by grinding surfaces at the core of the mold forming the nozzle after it has been machined as a turned part. The nozzle needle 32, which is likewise tapered downward and has a round cross section all around, makes contact in the practially-used control range with these secant surfaces 42 and spreads the surface 42 more or less apart, depending on their position or depth of immersion. Of course the surfaces could be tangent surfaces on the needle 32. In this way the wall sections of the nozzle 40 therebetween are drawn closer to the outside surface of the nozzle needle and the three nozzle canals 44 (shown in FIG. 3) formed between the secant surfaces become narrower. With increasing depth of immersion, this narrowing of the nozzle canals 44 is slowed down exponentially, which, in conjunction with the exponential increase of the resistance for linear narrowing of the choke canals, acts in the direction of a straightening of the characteristic of the choke point 28 or the timing element 2. If the nozzle is made of plastic, it may be advantageous to slide a spring-elastic metal sleeve 46, which is indicated in FIGS. 2 and 3 by dotted lines, onto the outside thereof, in order to increase the restoring forces of the nozzle and to prevent permanent deformation of the basically spring-elastic plastic by aging, for example.

FIG. 4 shows a modified form of the choke point 28, in which a nozzle 440 has a cross section in the form of a circular ring and a nozzle needle 432 guided therein has a square cross section with rounded corners, so that four nozzle canals 444 are formed.

FIG. 5 shows a further modified embodiment in which a nozzle 540 has similar cross section with a basically round form and three secant surfaces 542 as does the nozzle according to FIGS. 2 and 3, but it has a thicker wall and is as little elastically deformable as possible. A nozzle needle 532 which is disposed in the nozzle 540 has a cross section which represents a thin-walled circular ring, i.e. it is a thin-walled downward tapered tube. The interior of the nozzle needle 532 may be filled with rubber or a rubber-elastic material, which can be cast or pulled into the nozzle needle. Upon axial movement of the nozzle and the nozzle needle relative to each other, the nozzle needle 532 is deformed, whereby three nozzle canals 544 become narrower or wider. In a this embodiment, the nozzle needle can remain hollow or unfilled, or a solid nozzle needle, or a rubber-elastic material can be used; a smooth surface must then be provided which permits sliding at the secant surfaces of the nozzle 540.

The modified embodiment of a choke point shown in FIG. 6 has a nozzle 640 which has the shape of a circular ring after manufacture. A solid nozzle needle 632 with round cross section is disposed in the nozzle 640. A resilient metal sleeve 646 which is similar to the sleeve 46 in the embodiment according to FIGS. 2 and 3, is pushed onto the nozzle 640; as seen in the cross section, the sleeve, however, surrounds the nozzle on the outside thereof with a distance therebetween, but has channels 648 at three points which are offset inwardly and rest against the outside of the thin-walled nozzle 640 and press the latter against the nozzle needle 632 at three points that are uniformly distributed over the circumference thereof. The nozzle needle 632 has the form of a slightly truncated cone, whereby three nozzle canals 644 are again formed.

The following gives a numerical example for the embodiment according to FIG. 3. At the point of the cross section line III—III shown in FIG. 2, the nozzle needle is approximately 2.5 mm thick and has a one-sided conicity of 20 minutes of arc, i.e. 40 minutes of arc on both sides. The secant surfaces of the nozzle have, as measured in the direction of the secant, a width of 0.32 mm and therefore have a distance of about 7 μm from the imagined extension of the circular shape of the inside wall of the nozzle in their middle region. The taper of the nozzle is 55 minutes of arc to the vertical on one side, which altogether therefore results in a conicity of about 2 degrees of arc. It is a further advantage of the choke points described herein that due to the friction of the nozzle needle in the nozzle, the play in the screw thread between the set screw 30 and the tube stub 26 normally has no negative effect.

FIG. 7 shows a graphical representation of a characteristic 50 of a nozzle according to the state of the art, for instance as per German Patent No. 26 24 578, with a nozzle needle which freely extends into the nozzle, i.e. is not guided in the nozzle. The slanted straight line 52 represents an ideal characteristic of the timing element which is closely approached by the characteristics of the above-described embodiments. The slope of the characteristic, for instance in the embodiment according to FIGS. 2 and 3, depends on the number and width of the secant surfaces and therefore also on the height thereof or that of the ribs 42 or the nozzle 40.

In the nozzles according to the known state of the art, the nozzle needle can move transversely in the nozzle and occupy different positions. For instance it can rest against the wall of the nozzle or be in the center thereof, whereby the form of the choke gap is heavily variable, which has an effect on the flow conditions in the choke gap. These motions cause non-uniformities of the characteristic. If, in the region of the choke gap, the nozzle needle rests against the inside wall of the nozzle, an additional circumstance is that surface defects at the nozzle needle, such as flow lines caused by the injection molding operation have a different effect, depending on their position relative to the asymmetrical choke gap. If a surface defect of the nozzle needle rests against the nozzle, it has no effect. If, after the needle is rotated 180° it rests or is located at the widest point of the choke gap, it has a maximum effect in that it may make the flow flip from laminar to turbulent, for instance.

The irregularities of the characteristic caused in this manner are already substantially diminished if in the above-described nozzle arrangement the nozzle and the needle are not inserted into each other so deep that they touch each other along the contact points distributed over the circumference and have a deforming effect on each other. In this case, for instance as seen in FIG. 3, the nozzle needle 32 would rest only against one of the secant surfaces 42 or at two secant surfaces 42 and would be spaced at a small gap from the other two or the third secant surface. This narrow gap then represents a constriction or a narrow point of the choke gap between two expanded canals 44, through which the flow conditions in the canals 44 do not influence each other, so that a surface defect of the nozzle or the nozzle needle can affect only a part of the flow and therefore has less influence on the total resistance of the choke point and therefore on the characteristic of the timing element.

Deviating from the embodiment example shown, it is also possible to construct the nozzle and the nozzle needle so that there are only two contact points distributed over the circumference. For instance, a nozzle needle with oval cross section can cooperate with a nozzle of round cross section. Additional guides for the nozzle needle can then be provided near the choke point, so as to center the nozzle needle in a middle position in the nozzle, since only two contact points will naturally only accomplish this less perfectly. For instance, the nozzle can be tapered more in its lowest region and can have slots which are vertically brought up from below, whereby spring elastic guide ribs resting against a lower end section of the nozzle needle are produced for centering the needle with a suitable choice of material.

There are claimed:

1. Fluid timing element, comprising a nozzle, a needle being at least partly insertable into said nozzle forming a choke gap therebetween, at least one of said nozzle and said needle being axially tapered, said nozzle and said needle being axially movable relative to each other for adjusting said choke gap, said nozzle and said needle having different cross-sectional shapes and having at least two wall sections distributed over the peripheries thereof projecting into and constricting said choke gap, said nozzle and said needle being axially pressable into each other to exert radial pressure on each other for elastically deforming said cross-sectional shapes thereof over a given normal adjustment range and said nozzle having thin walls formed of elastic material being drawn toward said needle by said radial pressure.

2. Fluid timing element, comprising a nozzle, a needle being at last partly insertable into said nozzle forming a choke gap therebetween, at least one of said nozzle and said needle being axially tapered, said nozzle and said needle being axially movable relative to each other for adjusting said choke gap, said nozzle and said needle having different cross-sectional shapes and having at least two wall sections distributed over the peripheries thereof projecting into and constricting said choke gap, said nozzle and said needle being axially pressable into each other to exert radial pressure on each other for elastically deforming said cross-sectional shapes thereof over a given normal adjustment range and said needle being hollow and having thin walls formed of elastic material being drawn toward said needle by said radial pressure.

3. Fluid timing element according to claim 1, wherein said at least two wall sections are at least three wall sections.

4. Fluid timing element, comprising a nozzle, a needle being at least partly insertable into said nozzle forming a choke gap therebetween, at least one of said nozzle and said needle being axially tapered, said nozzle and said needle being axially movable relative to each other for adjusting said choke gap, said nozzle and said needle having different cross-sectional shapes and having at least two wall sections distributed over the peripheries thereof projecting into and constricting said choke gap, said nozzle and said needle being axially pressable into each other to exert radial pressure on each other for elastically deforming said cross-sectional shapes thereof over a given normal adjustment range and said nozzle having thin walls formed of elastic material, said cross-sectional shapes of at least one of said needle and nozzle being deformed by bending said walls thereof.

5. Fluid timing element, comprising a nozzle, a needle being at least partly insertable into said nozzle forming a choke gap therebetween, at least one of said nozzle and said needle being axially tapered, said nozzle and said needle being axially movable relative to each other for adjusting said choke gap, said nozzle and said needle having different cross-sectional shapes and having at least two wall sections distributed over the peripheries thereof projecting into and constricting said choke gap, said nozzle having an inner surface having a non-round cross-sectional shape formed of a single round cross-sectional shape interrupted by adjacent secant-shaped sections.

6. Fluid timing element, comprising a nozzle, a needle being at least partly insertable into said nozzle forming a choke gap therebetween, at least one of said nozzle and said needle being axially tapered, said nozzle and said needle being axially movable relative to each other for adjusting said choke gap, said nozzle and said needle having different cross-sectional shapes and having at least two wall sections distributed over the peripheries thereof projecting into and costricting said choke gap, at least one of said nozzle and needle being a plastic part, and including spring means being separate from said at least one plastic part and being formed of permanently elastic material biased against said at least one plastic part for reinforcing the shape of said at least one plastic part.

7. Fluid timing element, comprising a nozzle, a needle being at least partly insertable into said nozzle forming a choke gap therebetween, at least one of said nozzle and said needle being axially tapered, said nozzle and said needle being axially movable relative to each other for adjusting said choke gap, said nozzle and said needle having different cross-sectional shapes and having at least two wall sections distributed over the peripheries thereof projecting into and constricting said choke gap, at least one of said nozzle and needle being a plastic part, and including spring means formed of permanently elastic material biased against said at least one plastic part for reinforcing the shape of said at least one plastic part, said at least one plastic part having a normally round cross-sectional shape being deformed by said spring means into a non-round cross-sectional shape.

8. Fluid timing element according to claim 7, wherein said spring means is formed of metal.

* * * * *